Aug. 21, 1945. T. J. ZELLER Re. 22,669
POWER OPERATED CLUTCH MECHANISM
Original Filed Oct. 28, 1939
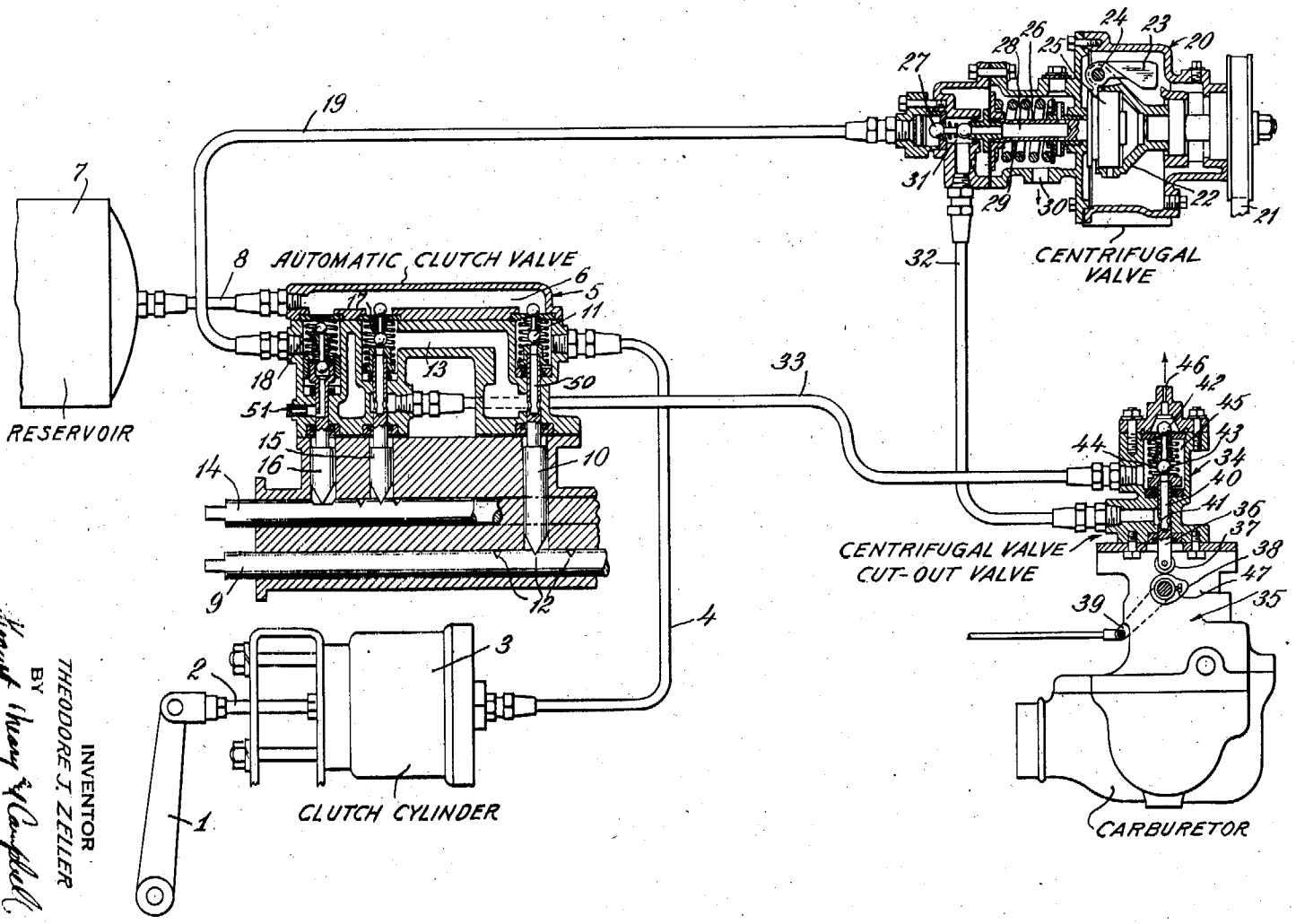
INVENTOR
THEODORE J. ZELLER
BY
Hoguet, Cheney & Campbell
ATTORNEYS Reissued Aug. 21, 1945

Re. 22,669

UNITED STATES PATENT OFFICE 22,669

POWER OPERATED CLUTCH MECHANISM

Theodore J. Zeller, Plainfield, N. J., assignor to Mack Manufacturing Corporation, Long Island City, N. Y., a corporation of Delaware Original No. 2,259,599, dated October 21, 1941, Serial No. 301,746, October 28, 1939. Application for reissue May 8, 1942, Serial No. 442,239

36 Claims. (Cl. 192—.01)

The present invention relates to automatic clutch control systems and embodies, more particularly, an improved automatic clutch control system in which full clutch engagement is insured under all conditions of operation where full clutch engagement is important.

Automatic clutch control systems have heretofore been provided in which the clutch lever is actuated by a clutch cylinder receiving a fluid (e. g. air) under pressure. The supply of the fluid from a reservoir is controlled by a centrifugal valve that is driven by the engine so that, as the engine speeds up, the fluid pressure in the clutch cylinder is relieved, thus permitting more complete clutch engagement. Conversely, as the engine speed approaches its idling speed, the fluid pressure in the clutch cylinder increases, thus releasing the engaging faces of the clutch.

These prior systems have also included an automatic clutch valve that is controlled by the gear shift mechanism so that, as a change of gear is being made, the clutch is released immediately prior to the shift and again engaged upon completion of the shift. This automatic valve also may be formed to prevent undesirable slippage when the vehicle is started in second or third speeds, and also prevents disengagement of the clutch by the centrifugal valve should the engine speed decrease while the vehicle is in second or third gear, thus eliminating any possibility of accidental free wheeling in second or third gear, and enables the engine to be used for braking when going down hill.

Although these prior systems function effectively under normal conditions, it has been found that under conditions of high traction resistance, complete clutch engagement would not be permitted. For example, in engaging a steep hill under full load, the vehicle and engine speed would be such that the centrifugal valve would begin to release the clutch even though maximum torque is essential. This partial clutch engagement would transmit enough torque at the speed range of 600 to 800 revolutions per minute to prevent the engine from increasing in speed to that required by the centrifugal valve for full clutch engagement. However, this torque is not enough to overcome the high traction resistance above referred to and the mechanism, therefore, would fail to function under these conditions.

An object of the present invention, accordingly, is to provide an automatic power operated clutch mechanism wherein means is provided to insure full clutch engagement under all conditions wherein such complete engagement is required.

A further object of the invention is to provide a mechanism of the above character wherein means is provided to effect full clutch engagement under conditions where the vehicle has high traction resistance and the engine speed is reduced but under the necessity of transmitting full torque.

Further objects of the invention will be apparent as it is described in greater detail in connection with the accompanying drawing wherein the single view is a diagrammatic illustration of an automatic power operated clutch mechanism in which the present invention has been embodied.

Referring to the drawing, a clutch lever of known form is shown at 1 and is actuated by a link 2 toward the left to effect disengagement of the clutch. This motion is accomplished by the clutch cylinder 3 also of known design and supplied by a suitable fluid under pressure such as air through a conduit 4. Conduit 4 communicates with an automatic clutch valve 5 which is formed with a manifold 6 receiving air under pressure from a reservoir 7 through a pipe 8.

The automatic clutch valve 5 utilizes the shifter rods of the transmission mechanism to effect disengagement of the clutch immediately prior to the changing of the transmission gears and to reengage the clutch after the speed change has been effected. For example, the first speed and reverse shifter rod 9 actuates a poppet 10 to actuate an intake and exhaust valve assembly 11 which in the raised position admits air under pressure from the manifold 6 to the conduit 4 and clutch cylinder 3 to disengage the clutch. After the speed change has been effected, the poppet drops into a notch 12 in the rod 9 to permit valve assembly 11 to close the air passage from the manifold 6 and to connect the conduit 4 by means of the passage 50 in poppet 10 to a manifold 13. The transmission mechanism is arranged so that the shifter rods will have sufficient free movement to insure actuation of the poppets before any gear movement starts.

The second and third speed shifter rod 14 actuates two poppets 15 and 16. Poppet 15 actuates a valve assembly 17 which in the raised position supplies air under pressure from the manifold 6 through the manifold 13, passage 50, and conduit 4 to the clutch cylinder to disengage the clutch. In the lowered position, valve assembly 17 closes the air passage from the manifold 6 and connects the manifold 13 with conduit 33 which in turn is connected with a centrifugal valve 20, as hereinafter described.

The poppet 16, which is actuated when shifter rod 14 is in second or third speed position, in turn actuates a valve assembly 18 which in the lowered position connects the manifold 6 with a conduit 19 which, in turn, is connected to the centrifugal valve 20. In the raised position which occurs during second and third speeds, valve assembly 18 disconnects manifold 6 from conduit 19 and exhausts conduit 19 to atmosphere through port 51. Port 51 may be restricted to control the speed of engagement into second and third gear.

The centrifugal valve 20 is driven from the engine by a suitable device such as a belt 21 that drives a weight carrier 22 upon which is mounted weights 23 pivoted at 24. The weights actuate a collar 25 connected to a valve stem 26 which actuates an intake and exhaust valve assembly 27. The valve stem 26 is hollow and formed with a passage 28 and port 29 communicating with the atmosphere through a port 30.

At high speeds, a fluid chamber 31 is connected by means of valve stem 26 and port 30 with the atmosphere. Fluid chamber 31 is connected to a conduit 32 which, as hereinafter described, is connected to a conduit 33 that is connected to the clutch cylinder by means of the automatic clutch valve and controlled by poppets 15 and 10 under predetermined conditions. At idling speed, valve assembly 27 closes the passage 28 and connects the fluid chamber 31 to the conduit 19.

It will thus be seen that the centrifugal valve will, according to the speed of the engine in first or reverse gear, either engage or disengage the clutch by admitting air under pressure from conduit 19 through conduit 32 and the automatic clutch valve to the clutch cylinder 3, or by permitting conduit 32 to exhaust to atmosphere. In all other speeds, conduit 19 exhausts to atmosphere through valve assembly 18 and port 51 and, accordingly, the centrifugal valve permits conduit 32 to exhaust to atmosphere regardless of engine speed. The foregoing mechanism is, in itself, old and illustrates the mechanism that has heretofore been used and subject, as above noted, to the disadvantage of preventing full clutch engagement under high traction resistance when the transmission is in first or reverse gear, which would cause the engine speed to approach idling speed.

The present invention provides the hereinafter described mechanism, in combination with the system above described, to insure full clutch engagement under all conditions of operation where it is desired, and to this end, utilizes a device to prevent the centrifugal valve from functioning when the engine throttle is in advanced positions.

In the accompanying drawing, this mechanism is shown by the legend "Centrifugal valve cut-out valve" and indicated by the reference character 34. The casing of valve 34 may be mounted on the carburetor 35 and is provided with a valve stem 36 carrying, at its lower end, a roller cam follower 37. The roller 37 rides on a cam 38 actuated by the throttle control lever 39 so that, in advanced throttle positions, the cam 38 moves the stem 36 upwardly.

The valve stem 36 is formed with an axial passage 40 and a port 41 which communicates with the conduit 32. The valve stem also operates a valve assembly 42, 43 through a spring 44, this valve assembly being received in a chamber 45 that communicates with the conduit 33, and the valve 42 communicates with the atmosphere through a port 46.

In advanced throttle positions, the passage 40 is closed from the conduit 33 by the valve 43 and the valve stem 36 lifts the valve 42 from its seat, permitting the clutch cylinder to exhaust to the atmosphere through the clutch valve, conduit 33, and port 46 of cut-out valve 34. At the same time the passage from the clutch valve and clutch cylinder to the centrifugal valve 20 is closed and control of the clutch cylinder is thus taken away from the centrifugal valve.

The cam 38 is adjustable by means of a set screw 47 so that operation of the cut-out valve may be accomplished at any desired throttle position.

The foregoing mechanism prevents burning of the clutch linings resulting from excessive slippage by insuring clutch engagement at advanced throttle positions with low engine speeds. The engine will either stall or the load will be moved.

A further advantage of the foregoing mechanism is that it permits of checking the clutch condition because the engine can be stalled by advancing the control to the position of full throttle. This is of definite advantage because operators frequently determine the need for adjustment by the time required to stall the engine by engaging the clutch in high gear with the emergency brake applied.

Further advantages will appear and the invention is not to be limited save as defined in the appended claims.

I claim:

1. The combination with a clutch and power operated mechanism to actuate the clutch, including a clutch cylinder adapted to receive a fluid under pressure, and means responsive to engine speed for controlling the pressure of the fluid in said clutch cylinder, of throttle actuating means, and means responsive to movement of said throttle actuating means to render the means responsive to engine speed ineffective to control the fluid pressure in the clutch cylinder when the throttle is advanced a predetermined amount.

2. The combination with a clutch and power operated mechanism to actuate the clutch, including a clutch cylinder adapted to receive a fluid under pressure, and means responsive to engine speed for controlling the pressure of the fluid in said clutch cylinder, of throttle actuating means, and means responsive to movement of said throttle actuating means adapted to establish communication between the clutch cylinder and the atmosphere when the throttle is advanced a predetermined amount, thereby rendering the centrifugal valve ineffective to control the fluid pressure in the clutch cylinder.

3. The combination with a clutch and power operated mechanism to actuate the clutch, including a clutch cylinder, adapted to receive a fluid under pressure, and means responsive to engine speed in fluid communication with the clutch cylinder for controlling the pressure of the fluid in the cylinder, of throttle actuating means, and means responsive to movement of said throttle actuating means adapted to interrupt fluid communication between the clutch cylinder and the means responsive to the engine speed, and to establish communication between the clutch cylinder and the atmosphere.

4. The combination with a clutch and power operated mechanism to actuate the clutch, including a clutch cylinder adapted to receive a fluid under pressure, centrifugal engine driven means adapted to control the pressure of fluid in the clutch cylinder, gear change mechanism, and means actuated by the gear change mechanism for rendering the centrifugal engine driven means effective for controlling the pressure of fluid in the clutch cylinder when the gear change mechanism is in at least one operating position, of throttle actuating means, and means operated by said throttle actuating means to render the centrifugal engine driven means ineffective to control the fluid pressure in the clutch cylinder when the throttle is advanced a predetermined amount.

5. The combination of a clutch and power operated mechanism to actuate the clutch comprising a reservoir of fluid under pressure, a clutch cylinder adapted to receive a fluid under pressure for disengaging the clutch, a centrifugal engine driven valve in fluid communication with the atmosphere and adapted to communicate with the fluid reservoir and with the clutch cylinder for controlling the fluid pressure in the clutch cylinder in accordance with the speed of the engine, gear change mechanism, a clutch valve actuated by the gear change mechanism for establishing fluid communication of the centrifugal valve with the fluid reservoir and with the clutch cylinder while the gear change mechanism is in at least one operating position, throttle actuating means, and means actuated by said throttle actuating means for interrupting the fluid communication between the centrifugal valve and the clutch cylinder while the throttle actuating means is in at least one operating position.

6. The combination of a clutch and power operated mechanism to actuate the clutch comprising a reservoir of fluid under pressure, a clutch cylinder adapted to receive a fluid under pressure for disengaging the clutch, a centrifugal engine driven valve in fluid communication with the atmosphere and adapted to communicate with the fluid reservoir and with the clutch cylinder for controlling the fluid pressure in the clutch cylinder in accordance with the speed of the engine, gear change mechanism, a clutch valve actuated by the gear change mechanism for establishing fluid communication of the centrifugal valve with the fluid reservoir and with the clutch cylinder while the gear change mechanism is in at least one operating position, throttle actuating means, and means actuated by said throttle actuating means for interrupting the fluid communication between the centrifugal valve and the clutch cylinder and for exhausting the clutch cylinder to atmosphere while the throttle actuating means is in at least one operating position.

7. The combination set forth in claim 6 in which the means for interrupting the fluid communication between the centrifugal valve and the clutch cylinder and for exhausting the clutch cylinder to atmosphere comprises a valve stem operated by the throttle actuating means forming a fluid communication between the centrifugal valve and the clutch cylinder, and a valve operated by the valve stem adapted to close the valve stem and to establish communication between the clutch cylinder and the atmosphere.

8. The combination set forth in claim 6 in which the means for interrupting the fluid communication between the centrifugal valve and the clutch cylinder and for exhausting the clutch cylinder to atmosphere comprises a valve stem forming a fluid communication between the centrifugal valve and the clutch cylinder, means to actuate the valve stem by the throttle actuating means, means to adjust the last named means, and means operated by the valve stem to close the valve stem and to establish communication between the clutch cylinder and the atmosphere.

9. The combination set forth in claim 6 in which the means for interrupting the fluid communication between the centrifugal valve and the clutch cylinder and for exhausting the clutch cylinder to atmosphere comprises a valve assembly having a casing formed with a chamber, said chamber being in fluid communication with the clutch cylinder, a valve stem operated by the throttle actuating means forming a fluid communication between the centrifugal valve and the chamber, a port in the casing open to the atmosphere, and a valve actuated by the valve stem to close the valve stem and to establish communication between the port and the valve chamber.

10. The combination set forth in claim 6 in which the means for interrupting the fluid communication between the centrifugal valve and the clutch cylinder and for exhausting the clutch cylinder to atmosphere comprises a valve assembly having a casing formed with a chamber connected to the clutch valve, a port in the casing open to the atmosphere, a first valve normally closing a communication between the atmosphere and the chamber, a second valve, a passage in the valve stem normally communicating with the chamber, a port in the valve stem connected to the passage and communicating with the centrifugal valve, and means to close the passage in the valve stem by the second valve and open the first valve upon actuation of the valve stem.

11. The combination of a clutch, gear shift mechanism, means responsive to movement of the gear shift mechanism for engaging and disengaging the clutch, means responsive to engine speed for rendering said first named means ineffective to engage the clutch at relatively low engine speed when the gear shift mechanism is in at least one operating position, throttle actuating means, and means responsive to movement of said last named means for rendering the means responsive to engine speed ineffective when the throttle is advanced a predetermined amount.

12. The combination of a clutch, power operated means for actuating the clutch, gear shift mechanism, means responsive to engine speed adapted to energize said clutch actuating means to disengage the clutch at relatively low engine speed, throttle actuating means, means responsive to movement of said last named means for rendering said engine speed responsive means ineffective when the throttle is advanced a predetermined amount, and means responsive to movement of the gear shift mechanism for rendering the engine speed responsive means and the means responsive to movement of the throttle actuating means effective when the gear shift mechanism is in at least one operating position.

13. The combination of a clutch, fluid pressure responsive means for disengaging the clutch, a reservoir of fluid under pressure, gear shift mechanism, valve means responsive to movement of the gear shift mechanism for admitting fluid from said reservoir to said clutch disengaging means during shifting movement of the gear shift mechanism, said valve means being formed to release fluid from the clutch disengaging means when the gear shift mechanism is in an operating position, means responsive to engine speed for rendering said valve means ineffective to release fluid from the clutch disengaging means at relatively low engine speed, thottle actuating means, and means responsive to movement of the throttle actuating means for rendering the engine speed responsive means ineffective when the throttle is advanced a predetermined amount.

14. The combination of a clutch, fluid pressure responsive means for disengaging the clutch, a reservoir of fluid under pressure, means responsive to engine speed in fluid communication with the atmosphere adapted to communicate with the clutch disengaging means and the fluid reservoir for admitting fluid to the clutch disengaging means at relatively low engine speed and for releasing fluid from the clutch disengaging means at higher engine speed, gear shift mechanism, valve means responsive to movement of the gear shift mechanism for admitting fluid from the reservoir to the clutch disengaging means during shifting movement of the mechanism and for releasing fluid from the clutch disengaging means when the mechanism is in at least one operating position, said valve means being formed to establish fluid communication between the engine speed responsive means and the fluid reservoir and clutch disengaging means when the mechanism is in at least one other operating position, throttle actuating means, and means responsive to movement of said last named means for interrupting the fluid communication between the engine speed responsive means and for releasing fluid from the clutch engaging means when the throttle actuating means is in at least one operating position.

15. The combination of a clutch, fluid pressure responsive means for disengaging the clutch, a reservoir of fluid under pressure, a plurality of fluid conduits, valve means responsive to engine sped for establishing fluid communication between the first and second conduits at relatively low engine speed and between the first conduit and the atmosphere at higher engine speed, gear shift mechanism, valve means responsive to movement of the gear shift mechanism for establishing fluid communication between the fluid reservoir and the clutch disengaging means during shifting movement of the gear shift mechanism, and to establish fluid communication between the clutch disengaging means and the first conduit when the gear shift mechanism is in an operating position, said last named valve means being formed to establish fluid communication between the second conduit and the fluid reservoir when the gear shift mechanism is in at least one operating position and between the second conduit and the atmosphere when the gear shift mechanism is in at least one other operating position, throttle actuating means, and valve means responsive to movement of the last named means for closing the first conduit and exhausting the clutch disengaging means when the throttle actuating means is in at least one operating position.

16. In combination with an automotive vehicle engine having a throttle-controlling member, a gear-changing mechanism including a plurality of members operable to establish different gear ratios, a clutch-controlling member, means including a fluid motor for controlling the clutch-disengaging and engaging movements of said last named member, valve means operable by said mechanism for controlling the energization of said motor, other valve means controlled by the speed of said engine for effecting energization and deenergization of said motor, means for rendering the last named valve means inoperative to energize the fluid motor, irrespective of engine speed, when the said mechanism is operated to establish a predetermined gear ratio, and means operated by movement of said throttle-controlling member to a predetermined position for effecting deenergization of said motor.

17. In combination with an automotive vehicle engine having a throttle-controlling member, a gear-changing mechanism, a clutch-actuating member, means including a fluid motor for controlling the movements of said member, means for varying the fluid pressure in said motor in order to effect and control the clutch-disengaging and engaging movements of said member, said means including a pair of valves, one operated by said mechanism, and the other controlled by the speed of the engine, means for interconnecting said valves in such maner that the fluid pressure in said motor is exhausted from the speed-responsive valve through the mechanism-operated valve to control the clutch-engaging movement of said member and irrespective of the gear ratio established by said mechanism, and means controlled by movement of said throttle-controlling member to a predetermined position for exhausting fluid pressure from said motor independently of the speed-responsive valve.

18. In combination with an automotive vehicle engine having a throttle-controlling member, a gear-changing mechanism, a clutch-actuating member, means including a fluid motor for controlling the movements of said member, a source of fluid pressure, means including a centrifugally-controlled valve means for connecting said motor with said source when the mechanism is in one predetermined position, means dependent upon operation of the mechanism to another predetermined position for disconnecting the centrifugally-controlled valve means from the source, and means for connecting said motor with the atmosphere including a device operated by movement of the throttle-controlling member to a predetermined position.

19. In combination with an automotive vehicle engine having a throttle-controlling member, a gear-changing mechanism, a clutch-actuating member, means including a fluid motor for controlling the movements of said member, means including a centrifugally-controlled valve means for connecting said motor with a source of fluid pressure, valve means actuated by said mechanism for connecting the motor with the source, means actuated by the movement of the mechanism to a predetermined position for disconnecting the centrifugally-controlled valve means from said source, and means for connecting said motor with the atmosphere including a device operated by movement of the throttle-controlling member to a predetermined position.

20. In combination with an automotive vehicle engine having a throttle-controlling member, a gear-changing mechanism including a manually-operable element movable to selectively establish first, second, third or reverse gear ratios, a clutch-controlling member, means including a fluid motor for controlling the clutch-disengaging and engaging movements of said member, valve means operable in accordance with variations in the speed of said engine, means connecting said valve means with said motor, a source of fluid pressure, means connecting said valve means and source, means for rendering said last named connecting means inoperative to connect the valve means and source when said element is moved to establish second or third gear ratios, and means for connecting said motor with the atmosphere including a device operated by movement of the throttle-controlling member to a predetermined position.

21. In combination with an automotive vehicle engine having a throttle-controlling member, a gear-changing mechanism including a plurality of elements movable to establish different gear ratios, a clutch-controlling member, means including a fluid motor for controlling the clutch-disengaging and engaging movements of said member, valve means operable by movement of said elements for controlling the energization of said motor, other valve means controlled by the speed of said engine for effecting energization and deenergization of said motor, means for rendering the last named valve means inoperative to energize the fluid motor, irrespective of engine speed, said last named means including a valve operable by movement of one of said elements, and means for effecting deenergization of said motor in accordance with movement of said throttle-controlling member to a predetermined position.

22. In combination with an automotive vehicle engine having a throttle-controlling member, a gear-changing mechanism including a pair of shiftable elements, a clutch-actuating member means including a fluid motor for controlling the movements of said member, means for varying the fluid pressure in said motor in order to effect and control the clutch-disengaging and engaging movements of said member, said means including a pair of valves, one operated by movement of one of said elements, and the other controlled by the speed of the engine, means including a valve operated by said one element for connecting said speed-controlled valve with a pressure source, means for interconnecting said pair of valves in such manner that the fluid pressure in said motor is exhausted from the speed-responsive valve by way of the element-operated valve to control the clutch-engaging movement of said member after establishment of the gear ratio determined by movement of said element, and means for exhausting fluid pressure from said motor in accordance with movement of said throttle-controlling member to a predetermined position.

23. In combination with an automotive vehicle engine having a throttle-controlling member, a gear-changing mechanism including a plurality of shiftable elements, a clutch-actuating member, means including a fluid motor for controlling the movements of said member, means including a centrifugally-controlled valve means for controlling the flow of fluid pressure to and from the motor, valve means actuated by movement of the elements for controlling the flow of fluid pressure to and from the motor, means operated by movement of one of said elements for rendering the centrifugally-controlled valve means inoperative to control the flow of fluid pressure to the motor when said one element is moved to a predetermined position, and means operated by movement of the throttle-controlling member to a predetermined position for controlling the flow of fluid pressure from the motor independently of said centrifugally-controlled valve means.

24. In combination with an automotive vehicle engine having a throttle-controlling member, a gear-changing mechanism including a plurality of shiftable elements, a clutch-actuating member, means including a fluid motor for controlling the movements of said member, a source of fluid pressure, means including a centrifugally-controlled valve means for connecting said motor with the source, valve means actuated by movement of said elements for connecting the motor with the source, means actuated by the movement of one of the elements to a predetermined position for disconnecting the centrifugally-controlled valve means from said source, and means for connecting said motor with the atmosphere comprising a valve operable upon movement of the throttle-controlling member to a predetermined position.

25. In combination with an automotive vehicle engine having a throttle-controlling member, a gear-changing mechanism including a plurality of shiftable elements, a clutch-actuating member, means including a fluid motor for controlling the movements of said member, valve means operable by movement of said elements in effecting all changes of gear to supply fluid pressure to said motor to cause clutch-disengaging movement of said member, other valve means responsive to the speed of the engine for conducting fluid pressure to and from the motor, means operated by one of said elements during movement thereof in either of opposite directions to effect predetermined changes of gear for rendering the last named valve means inoperative to supply fluid pressure to the motor, said last named means including a valve device operated by said one element, and a valve operated upon movement of said throttle-controlling member to a predetermined position for conducting fluid pressure from the motor.

26. In an automotive vehicle having an engine and throttle-controlling member, a clutch-controlling member, and a transmission of the type having a plurality of shift rails shiftable to establish a desired gear relation, a fluid motor for controlling disengaging and engaging movements of said clutch member, valve means responsive to the speed of the engine for controlling the flow of fluid to and from said motor, valve devices respectively operable by shifting movements of said rails for controlling the flow or fluid to and from said motor, valve mechanism operated by one of the rails during shifting movement thereof for controlling the communication between the speed-responsive valve means and a fluid pressure source, and means for connecting said valve means and valve devices whereby fluid from said motor is conducted to said valve means through said valve devices, said last named means including a valve operable in accordance with movement of said throttle-controlling member to a predetermined position.

27. A motor vehicle having an engine, gear shifting means, a vehicle controlling element, and a clutch-controlling member, a fluid motor operatively connected with the member for controlling clutch-disengaging and engaging movements thereof, a source of air under pressure, valve means for controlling the application and exhaust of air under pressure to and from said motor, means responsive to engine speed for controlling said valve means, and means controlled by said element independently of the operation of said gear shifting means and operable at will for exhausting said motor independently of said valve means and said speed-responsive means.

28. A motor vehicle having an engine, a throttle-controlling member and a clutch-controlling member, a fluid motor operatively connected with the last named member for controlling clutch-disengaging and engaging movements thereof, a source of air under pressure, valve means for controlling the application and exhaust of air under pressure to and from said motor, means responsive to engine speed for controlling said valve means, and means operated by movement of said throttle-controlling member to a predetermined position for fully exhausting said motor independently of the controlling action of said valve means and said speed-responsive means.

29. In a motor vehicle having an engine, a change-speed transmission provided with a pair of shiftable elements, a clutch-controlling member, and a throttle-controlling element, power means controlling the clutch member, means including valves associated with the shiftable elements for energizing the power means during shifting movement of either element, and means operated by movement of the throttle-controlling member to a predetermined position to deenergize the power means.

30. In a motor vehicle having an engine, a change-speed transmission provided with a pair of shiftable elements, a clutch-controlling member, and a throttle-controlling element, power means controlling the clutch member, means including valves associated with the shiftable elements for energizing the power means during shifting movement of either element, means responsive to the speed of the engine for normally controlling the deenergization of the motor for enabling clutch-engaging movement of the clutch member upon increase of engine speed above a predetermined value, and means operated by movement of the throttle-controlling member to a predetermined position for deenergizing said power means independently of the speed-responsive means.

31. In a motor vehicle having an engine, a change-speed transmission provided with a pair of shiftable elements, a clutch-controlling member, and a throttle-controlling element, power means controlling the clutch member, means operable by movement of said shiftable elements for energizing said power means, and means for controlling the deenergization of said power means, said last named means including a pair of valve devices, one device operable in accordance with changes in engine speed and the other actuated by movement of the throttle-controlling element.

32. In an automotive vehicle having an engine, an accelerator for controlling the speed of the engine, a controlling member and a transmission of the type having means movable in opposite directions from a neutral position to control the establishment of one or the other of a pair of gear ratios, a fluid motor operatively connected to said member, and means for controlling the energization of said motor including control mechanism operable by movement of the first named means to neutral position and a device connected in series with said control mechanism and operable on movement of said accelerator to a predetermined position for effecting energization of said motor.

33. In an automotive vehicle having an engine, an accelerator for controlling the speed of the engine, and a transmission of the type having means movable in opposite directions from neutral position to control the establishment of desired gear ratios, a controlling member for the vehicle, a fluid motor operatively connected with the said member, and means for controlling the energization of said motor comprising a source of energy and a circuit connected thereto and having a pair of devices arranged in series therein, one of said devices being controlled by movement of said first named means and the other device being actuated by movement of said accelerator to a predetermined position for effecting energization of said motor.

34. In an automotive vehicle having an engine, an accelerator for controlling the speed of the engine, a controlling member, and a transmission of the type having means movable in opposite directions from neutral position to control the establishment of desired gear ratios, a fluid motor operatively connected with said member, and a pair of serially connected devices controlled respectively by movement of the first named means to neutral position and by movement of the accelerator to release position for effecting energization of said motor.

35. In a motor vehicle having an engine, a change speed transmission provided with shiftable elements, a vehicle controlling member, and a throttle controlling element, a fluid motor for controlling said member, means including a valve associated with a shiftable element of the transmission and operable thereby for energizing said motor on shifting movement of said element to neutral position, and means including a second valve serially connected with said first named valve and operable on movement of said throttle controlling element to release position to connect said first named valve and motor.

36. In a motor vehicle having an engine, a change speed transmission provided with a shiftable element movable in either direction from a neutral position for establishing one or the other of a pair of gear ratios, a vehicle controlling element, and a throttle controlling element, a fluid motor connected with said vehicle controlling element, and means including a pair of serially connected valves operable respectively by movement of the shiftable element to neutral position and by release movement of the throttle controlling element for energizing said motor.

THEODORE J. ZELLER.